United States Patent
Kasprzyk et al.

(10) Patent No.: US 10,850,584 B2
(45) Date of Patent: Dec. 1, 2020

(54) DAMPER HOUSING AND A METHOD FOR MANUFACTURING THE DAMPER HOUSING

(71) Applicant: BeijingWest Industries Co., Ltd., Beijing (CN)

(72) Inventors: Dominik Kasprzyk, Debica (PL); Grzegorz Gasior, Ciezkowice (PL)

(73) Assignee: BeijingWest Industries Co., Ltd., Beijing (CN)

( * ) Notice: Subject to any disclaimer, the term of this patent is extended or adjusted under 35 U.S.C. 154(b) by 148 days.

(21) Appl. No.: 15/584,896

(22) Filed: May 2, 2017

(65) Prior Publication Data
US 2017/0349020 A1 Dec. 7, 2017

Related U.S. Application Data
(60) Provisional application No. 62/346,806, filed on Jun. 7, 2016.

(51) Int. Cl.
*B60G 15/06* (2006.01)
*F16F 9/32* (2006.01)
(Continued)

(52) U.S. Cl.
CPC .............. *B60G 15/06* (2013.01); *B21C 1/26* (2013.01); *B60G 15/12* (2013.01); *B60G 15/14* (2013.01); *F16F 9/3235* (2013.01); *B21D 22/28* (2013.01)

(58) Field of Classification Search
CPC ...... F16F 9/3235; F16F 2226/00; F16F 7/123; F16F 9/062; F16F 9/3242; B21C 1/26;
(Continued)

(56) References Cited

U.S. PATENT DOCUMENTS 3,519,109 A * 7/1970 Whisler, Jr. ............ F16F 9/185
188/269
3,571,903 A * 3/1971 Persson ................. B23P 19/062
29/432.1
(Continued)

FOREIGN PATENT DOCUMENTS

| CN | 1110485 | 10/1995 |
|---|---|---|
| CN | 104994970 | 10/2015 |

(Continued)

OTHER PUBLICATIONS

First Office Action and Search Report dated Jun. 27, 2018 for counterpart Chinese Patent Application No. 201701355449.3.
European Search Report dated Oct. 9, 2017 (9 Pages).

*Primary Examiner* — Bradley T King
*Assistant Examiner* — Mahbubur Rashid
(74) *Attorney, Agent, or Firm* — William H. Honaker; Dickinson Wright PLLC

(57) ABSTRACT

A damper housing disposed on a center axis includes an extended mains section and a narrowed end section. The narrowed end section has a second predetermined wall thickness less than the first predetermined wall thickness of the extended main section. An intermediate conical section, connecting the narrowed end section and the extended main section, has an intermediate conical section wall thickness equal to the second predetermined wall thickness at an internal inclination angle relative to the center axis. A method for manufacturing the damper housing using a preformed tube, a first broaching die, a calibrating mandrel, and a swaging die is performed by compressing the preformed tube between the first broaching die and the narrowed head of the calibrating mandrel and compressing the preformed tube between the swaging die and the intermediary section of the calibrating mandrel to form the nar- (Continued)

rowed end section and the intermediate conical section, respectively.

10 Claims, 6 Drawing Sheets

(51) Int. Cl.
    *B21C 1/26*           (2006.01)
    *B60G 15/12*         (2006.01)
    *B60G 15/14*         (2006.01)
    *B21D 22/28*         (2006.01)

(58) Field of Classification Search
    CPC ......... B21C 37/12; B21C 37/30; B21D 22/28;
                B60G 15/06; B60G 15/12; B60G 13/06;
                B60G 2202/24; B60G 2206/41
    See application file for complete search history.

(56) References Cited

U.S. PATENT DOCUMENTS

| | | | | |
|---|---|---|---|---|
| 3,945,231 | A * | 3/1976 | Imazu | B21D 22/20 72/45 |
| 4,320,848 | A * | 3/1982 | Dye | B21D 22/28 220/581 |
| 4,339,939 | A * | 7/1982 | Book | B21D 22/28 72/348 |
| 4,484,670 | A | 11/1984 | Axthammer et al. | |
| 4,541,265 | A * | 9/1985 | Dye | B21D 22/28 72/347 |
| 5,236,115 | A * | 8/1993 | Pape | B21H 1/04 228/170 |
| 5,460,024 | A * | 10/1995 | Meneghin | B21D 22/28 72/349 |
| 5,778,722 | A * | 7/1998 | Saiki | B21D 51/26 72/347 |
| 5,980,339 | A * | 11/1999 | Hartman | F15B 15/149 440/61 G |
| 6,109,636 | A * | 8/2000 | Klein | B62K 25/28 280/275 |
| 6,702,345 | B1 * | 3/2004 | Yoshida | B60R 19/34 188/377 |
| 7,022,932 | B2 * | 4/2006 | Hatakeyama | B21D 17/02 219/61 |
| 2002/0170331 | A1 | 11/2002 | Brochheuser et al. | |
| 2005/0011245 | A1 * | 1/2005 | Nishimura | B21C 37/0811 72/370.04 |
| 2006/0131949 | A1 * | 6/2006 | Jahani | B21C 25/08 301/124.1 |
| 2009/0065462 | A1 * | 3/2009 | Gansweidt | B61G 7/10 213/1 A |
| 2012/0266644 | A1 * | 10/2012 | Blei | B21D 22/04 72/349 |
| 2014/0048364 | A1 * | 2/2014 | Nishimura | F16F 9/325 188/297 |
| 2014/0090938 | A1 * | 4/2014 | Nishimura | F16F 9/062 188/269 |
| 2014/0262651 | A1 * | 9/2014 | Luczak | F16F 9/3235 188/297 |
| 2015/0082853 | A1 * | 3/2015 | Ramirez Fernandez | B21D 22/22 72/349 |
| 2015/0093591 | A1 * | 4/2015 | Walde | B21D 22/21 428/603 |
| 2015/0314357 | A1 * | 11/2015 | Yamagata | B21D 22/30 72/370.15 |
| 2015/0377315 | A1 | 12/2015 | Gunther et al. | |
| 2016/0074922 | A1 * | 3/2016 | Kostermeier | B21D 22/16 72/69 |

FOREIGN PATENT DOCUMENTS

| | | |
|---|---|---|
| DE | 1931028 | 1/1966 |
| DE | 1953151 | 4/1971 |
| DE | 8507642 | 6/1985 |
| DE | 258754 | 8/1988 |
| DE | 19711028 | 9/1998 |
| DE | 10122794 | 11/2002 |
| DE | 102004024898 | 12/2005 |
| DE | 69831118 | 2/2006 |
| DE | 102005040101 | 3/2007 |
| DE | 102007021228 | 11/2008 |
| EP | 0076339 | 4/1983 |
| EP | 3213837 | 9/2017 |
| FR | 2050704 | 3/1971 |
| FR | 2456262 | 5/1980 |
| FR | 2558230 | 1/1985 |
| GB | 1031650 | 6/1966 |
| GB | 1145942 | 2/1969 |
| GB | 2240379 | 7/1991 |
| JP | 2006272396 | 10/2006 |
| SU | 1810177 A1 * | 4/1993 |
| WO | 2011093055 | 8/1911 |
| WO | 2011096907 | 8/2011 |

* cited by examiner

US 10,850,584 B2

DAMPER HOUSING AND A METHOD FOR MANUFACTURING THE DAMPER HOUSING

CROSS REFERENCE TO RELATED APPLICATION

This application claims the benefit of provisional application Ser. No. 62/346,806 filed on Jun. 7, 2016, the entire contents of which are incorporated by reference.

BACKGROUND OF THE INVENTION

1. Field of the Invention

The present invention relates generally to a damper housing and a method of manufacturing the damper housing.

2. Description of the Prior Art

Such a damper housing is disclosed in the prior art. The damper housing includes an external tube disposed on a center axis and extending between a first end and a second end defining a chamber for receiving a working fluid. The external tube including an extended main section disposed on the center axis having a first predetermined wall thickness extending from the first end to an intermediate end spaced from the second end. The external tube further includes a narrowed end section disposed on the center axis spaced from the intermediate end and extending from the second end to a proximate end spaced a predetermined distance away from the second end and adjacent to the intermediate end. The narrowed end section has a second predetermined wall thickness greater than the first predetermined wall thickness of the extended main section. An intermediate conical section extends between the proximate end of the narrowed end section and the intermediate end of the extended main section of the external tube connecting the narrowed end section with the extended main section. An end cap attached to the second end of the external tube defining the chamber between the external tube and the end cap for containing the working fluid.

The prior art also discloses a method of making the damper housing. The method includes the steps of forming a narrowed end section on the preformed tube adjacent the second end of the preformed tube and forming an intermediate conical section on the preformed tube adjacent the narrowed end section.

SUMMARY OF THE INVENTION

The invention provides for such damper housing wherein the narrowed end section of the external tube has a second predetermined wall thickness with the second predetermined wall thickness being less than the first predetermined wall thickness of the extended main section providing an increase in internal volume of the damper housing and an increase in heat transfer of the working fluid in the chamber.

The invention provides for such method wherein the step of forming the narrowed end section including a step of compressing the preformed tube between the first broaching die and the narrowed head of the calibrating mandrel to sandwich the preformed tube between the first broaching die and the narrowed head of the calibrating mandrel in the opening. By compressing, the second end of the preformed tube is forced to abut the narrowed head of the calibrating mandrel allowing the preformed tube and the narrowed head to extend through the opening to produce the narrowed end section having a second predetermined wall thickness less than the preformed tube wall thickness and a second predetermined radius equal to the opening radius between the second end of the preformed tube and an proximate end spaced a predetermined distance from the second end and defining an extended main section spaced from the narrowed end section extending from the first end of the preformed tube to an intermediate end spaced from the proximate end having the preformed tube radius greater than the second predetermined radius and the preformed tube wall thickness greater than the second predetermined wall thickness.

Advantages of the Invention

The invention in its broadest aspect provides an increased internal volume in the damper housing without affecting external dimensions of the damper housing.

The invention also provides a decrease in mass of the damper tube thereby resulting in an increase of fuel economy for the vehicle.

The invention further provides an increased heat transfer for the working fluid contained in the chamber of the damper housing.

The invention enables for the constructing dampers with an improved performance and a lighter design at a low cost.

The invention further provides a method of forming the damper housing including an intermediate conical section and a narrowed end section with increased precision and simple and economic to produce.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 1:
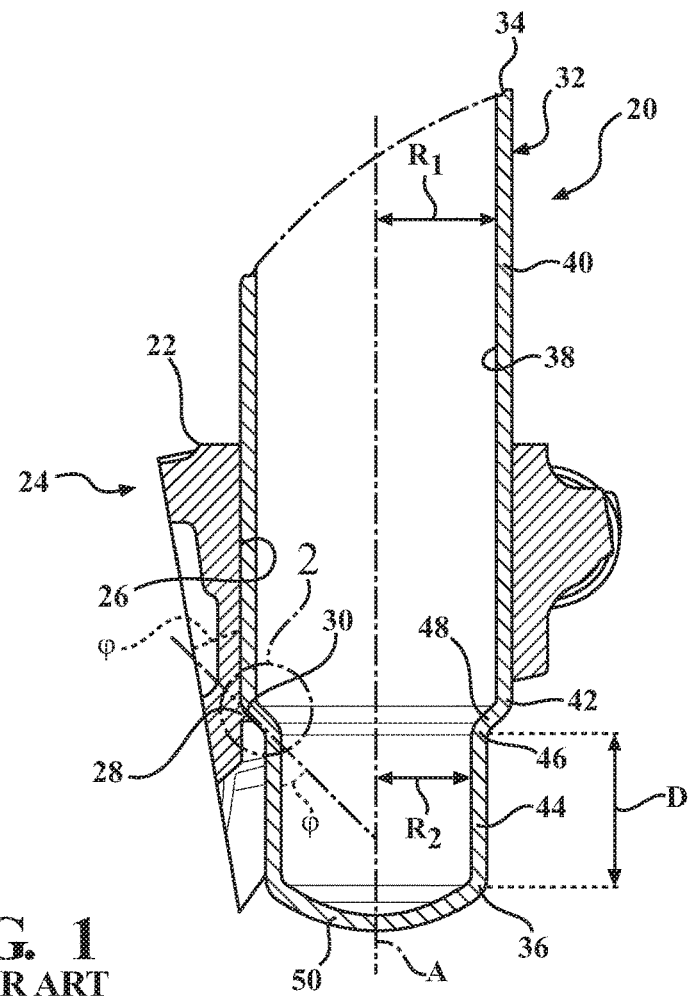
FIG. 1 is a cross-sectional perspective view of a stub axle and a damper housing in accordance with the prior art.

Referring to the Figures, wherein like numerals indicate corresponding parts throughout the several views, it is one aspect of the present invention to provide a damper housing 20 for a suspension assembly, e.g. a hydraulic damper. The damper housing 20 may be used for engaging a stub axle 22 of a vehicle 24 defining a through bore 26 and having a positioning step 28 disposed in the through bore 26. The positioning step 28 extends outwardly from the stub axle 22 forming a ramp surface 30 at an external inclination angle φ of between 40°-90° relative to the stub axle 22.

Figure 2:
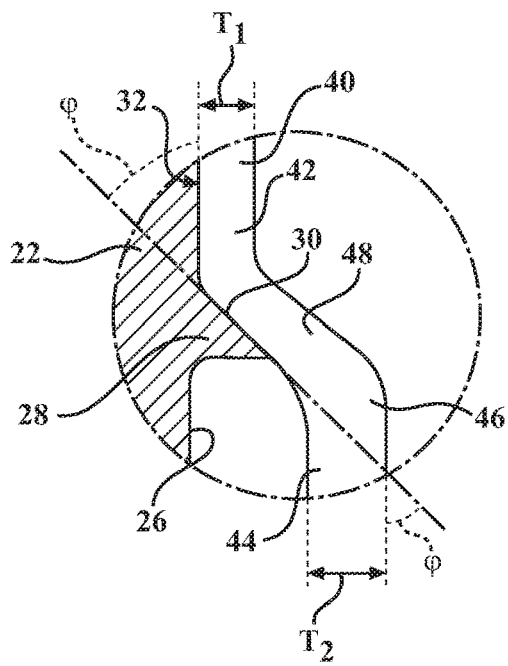
FIG. 2 is an fragmentary enlarged view of the area 2 of the intermediate conical section of the damper housing in accordance with the prior art.

The damper housing 20, as disclosed in the prior art, is generally shown in FIGS. 1 and 2. The damper housing 20 includes an external tube 32, as generally indicated, having a generally cylindrical shape disposed about a center axis A. The external tube 32 extends between a first end 34 and a second end 36 and defining a chamber 38 for receiving a working fluid. The external tube 32 includes an extended main section 40 having a cylindrical shape and having a first predetermined radius $R_1$ between the center axis A and the external tube 32. The extended main section 40 also has a first predetermined wall thickness $T_1$ disposed on the center axis A and extends annularly about the center axis A from the first end 34 to an intermediate end 42 spaced from the second end 36. The external tube 32 includes a narrowed end section 44 having a cylindrical shape disposed about the center axis A spaced from the intermediate end 42 of the extended main section 40. The narrowed end section 44 defines a second predetermined radius $R_2$ between the center axis A and the external tube 32. The second predetermined radius $R_2$ is less than the first predetermined radius $R_1$ and extends from the second end 36 to a proximate end 46 spaced a predetermined distance D away from the second end 36 and adjacent to the intermediate end 42.

The external tube 32 further includes an intermediate conical section 48 extending between the proximate end 46 of the narrowed end section 44 and the intermediate end 42 of the extended main section 40 of the external tube 32 connecting the narrowed end section 44 with the extended main section 40. The intermediate conical section 48 has an internal inclination angle θ of between 40°-90°, relative to the center axis A for engaging the external inclination angle φ of the ramp surface 30 of the stub axle 22. An end cap 50, having a circular shape and an arcuate shape in cross-section, is attached to the second end 36 of the external tube 32 defining the chamber 38 between the external tube 32 and the end cap 50 for containing the working fluid.

The narrowed end section 44 of the external tube 32 has a second predetermined wall thickness $T_2$. The second predetermined wall thickness $T_2$ is greater than the first predetermined wall thickness $T_1$. The increase in the predetermined wall thickness between the first predetermined wall thickness $T_1$ and the second predetermined wall thickness $T_2$ creates a decrease in space inside the external tube 32, i.e. a decrease in the internal volume. As a result, there is a superfluous mass increase for the external tube 32 and a decrease in the cooling rate of the heat generated during the dissipation of energy in the damper. The decrease in the internal volume has a particular importance for twin-tube type dampers wherein the decrease in the internal volume results in a temporary loss of damping forces generated by a base valve positioned in the narrowed end section 44, by introducing gas into the base valve, especially during rebound stroke.

Figure 3:
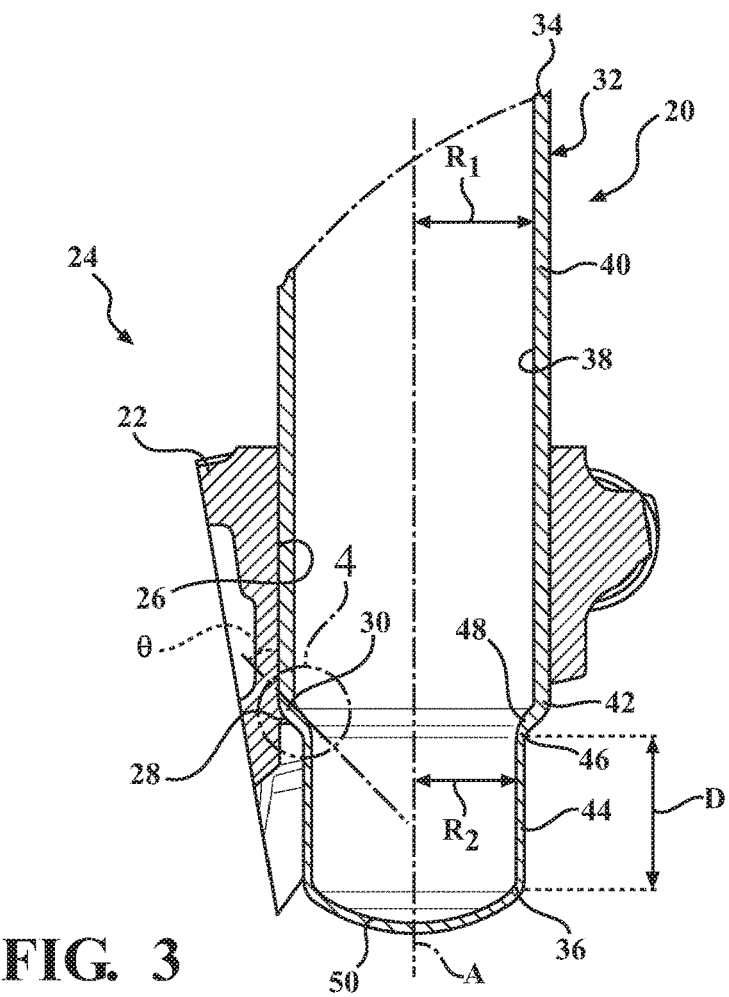
FIG. 3 is a cross-sectional perspective view of the stub axle and the damper housing in accordance with the present invention.
Figure 4:
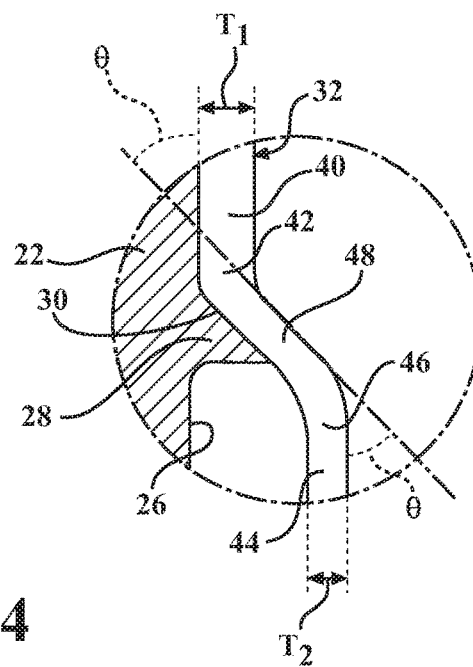
FIG. 4 is a fragmentary enlarged view of the area 4 of the intermediate conical section of the damper housing in accordance with the present invention.

The damper housing 20, as constructed in accordance with the present invention is general shown in FIGS. 3 and 4. The damper housing 20 includes an external tube 32, as generally indicated, having a generally cylindrical shape disposed about a center axis A, extending between a first end 34 and a second end 36, and defining a chamber 38 for receiving a working fluid. The external tube 32 has an extended main section 40, a narrowed end section 44, and an intermediate conical section 48 connecting the extended main section 40 and the narrowed section. The extended main section 40 of the external tube 32 has a cylindrical shape and extends annularly about the center axis A from the first end 34 to an intermediate end 42 spaced from the second end 36. The extended main section 40 has a first predetermined radius $R_1$ between the center axis A and the external tube 32 and a first predetermined wall thickness $T_1$ disposed on the center axis A. The narrowed end section 44 of the external tube 32, having a cylindrical shape, is disposed about the center axis A spaced from the intermediate end 42 of the extended main section 40 and extends from the second end 36 to a proximate end 46 spaced a predetermined distance D away from the second end 36 and adjacent to the intermediate end 42. The narrowed end section 44 has a second predetermined radius $R_2$ less than the first predetermined radius $R_1$ between the center axis A and the external tube 32. The intermediate conical section 48 extends between the proximate end 46 of the narrowed end section 44 and the intermediate end 42 of the extended main section 40 of the external tube 32 to connect the narrowed end section 44 with the extended main section 40. An end cap 50, having a circular shape and an arcuate shape in cross-section, is attached to the second end 36 of the external tube 32 defining the chamber 38 between the external tube 32 and the end cap 50 for containing the working fluid.

The narrowed end section 44 of the external tube 32 has a second predetermined wall thickness $T_2$ with the second predetermined wall thickness $T_2$ being less than the first predetermined wall thickness $T_1$ of the extended main section 40 providing an increase in internal volume of the damper housing 20 and an increase in heat transfer of the working fluid in the chamber 38. The intermediate conical section 48 extends from the intermediate end 42 of the extended main section 40 and toward the center axis A and having an intermediate conical section 48 wall thickness equal to the second predetermined wall thickness $T_2$. The intermediate conical section 48 an internal inclination angle θ of between 40°-90°, more preferably 45°, relative to the center axis A for engaging the external inclination angle φ of the ramp of the stub axle 22.

It should be appreciated that, other than the external tube 32, the internal components of a damper to do not form parts of the present invention. For one skilled in the art, the damper according to the present invention may be of any type, such as, but not limited to a hydraulic twin-tube damper.

It is another aspect of the present invention to provide a method for manufacturing the damper housing 20. The method, as shown in FIGS. 5-11, uses a preformed tube 32, a first broaching die 52, a swaging die 54, and a calibrating mandrel 56. The preformed tube 32 is disposed on the center axis A extending between the first end 34 and the second end 36 and having a preformed tube wall thickness $T_3$ and a preformed tube radius $R_P$. The preformed tube wall thickness $T_3$ may be equal to the first predetermined wall thickness $T_1$. The preformed tube radius $R_P$ may be equal to the first predetermined radius $R_1$. The first broaching die 52, having a rectangular shape in cross-section, defines an opening 58 having an opening radius $R_O$ less than the preformed tube radius $R_P$. Preferably, the opening radius $R_O$ should correspond to the second predetermined radius $R_2$ of the narrowed end section 44. The opening 58 flares annularly outwardly at a first angle α of between 10°-40° relative to an edge 60 of the opening 58. The swaging die 54 defines a hole 62 having a hole radius $R_H$ at least equal to the opening radius $R_O$. It should be appreciated that the hole radius $R_H$ is at least approximately 0.03 mm greater than the opening radius $R_O$. The hole 62 flares annularly outwardly at a second angle β of between 45°-50° relative to the an periphery 64 of the hole radius $R_H$.

The calibrating mandrel 56 includes a body 66 having cylindrical shape defining a body radius $R_B$. The body radius $R_B$ could be equivalent to the first predetermined radius $R_1$ of the extended main section 40. The calibrating mandrel 56 further includes a narrowed head section 68, having a predetermined length L spaced from the body 66 and defining a head radius $R_{HE}$ less than the opening radius $R_O$. It should be appreciated that the head radius $R_{HE}$ of the calibrating mandrel 56 is less than the opening radius $R_O$ by no more than the first predetermined thickness of the preformed tube 32 with the opening 58 of the first broaching die 52. In addition, the calibrating mandrel 56 includes an intermediary section 70 extending between the body 66 and the narrowed head at an exterior inclination angle γ of being between 45°-65° relative to a reference axis X perpendicular to the center axis A. The intermediate section has a maximal intermediary radius $R_M$. A supporting sleeve 72 is disposed about the body 66 of the calibrating mandrel 56. It should be appreciated that the exterior inclination angle γ is no more than 0°-15° greater than the second angle β of the swaging die 54. More preferably, the exterior inclination angle γ should be between 8°-12° degrees more than the second angle β of the swaging die 54. The first broaching die 52 and the swaging die 54 may be installed on one common head for the coaxial alignment and rectilinear movement with respect to the calibrating mandrel 56.

Figures 5, 6, 7:
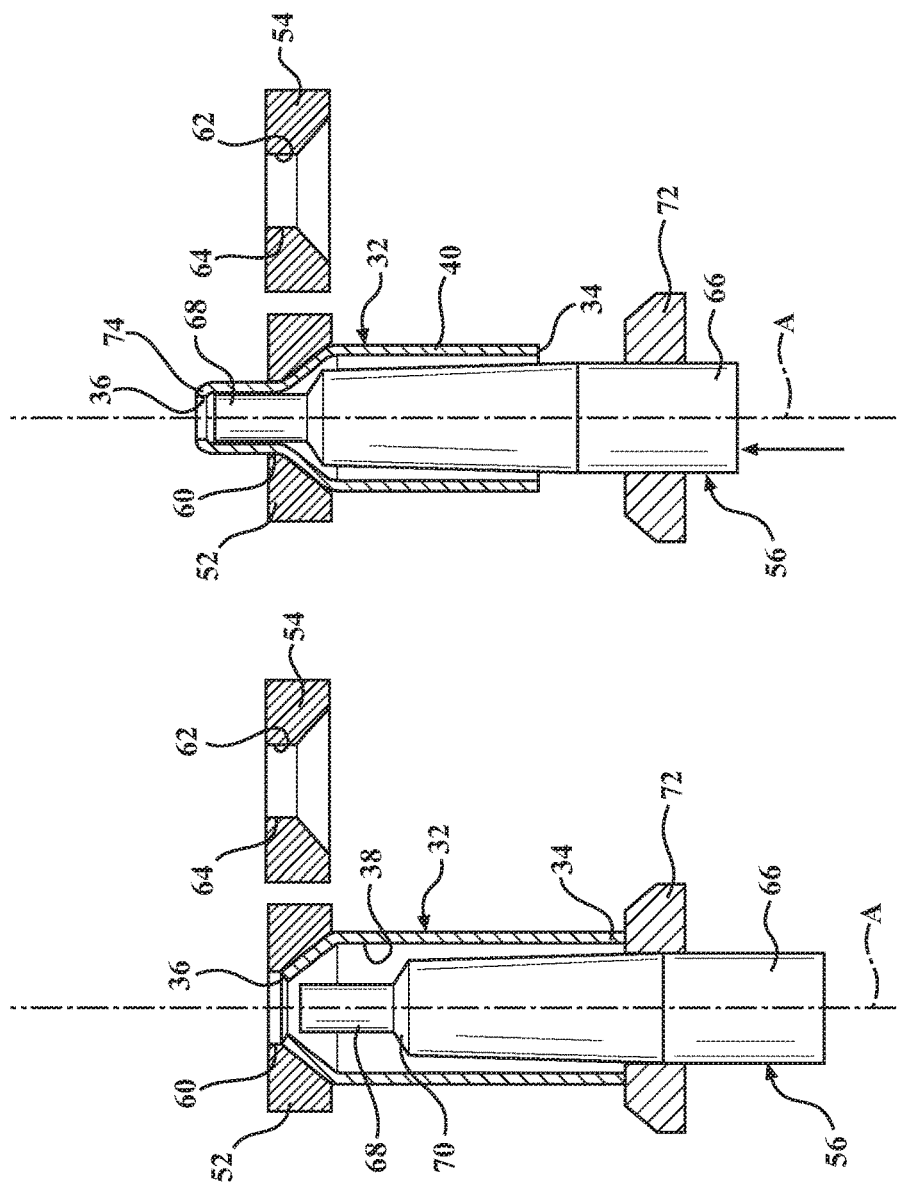
FIG. 5 is an illustrative view of the step of disposing the preformed tube about the calibrating mandrel of the method in accordance with the present invention.
FIG. 6 is an illustrative view of the step of pressing the preformed tube of the step of forming the narrowed end section of the method in accordance with the present invention.
FIG. 7 is an illustrative view of the step of compressing the first broaching die of the step of forming the narrowed end section of the method in accordance with the present invention.
Figures 8, 9, 10:
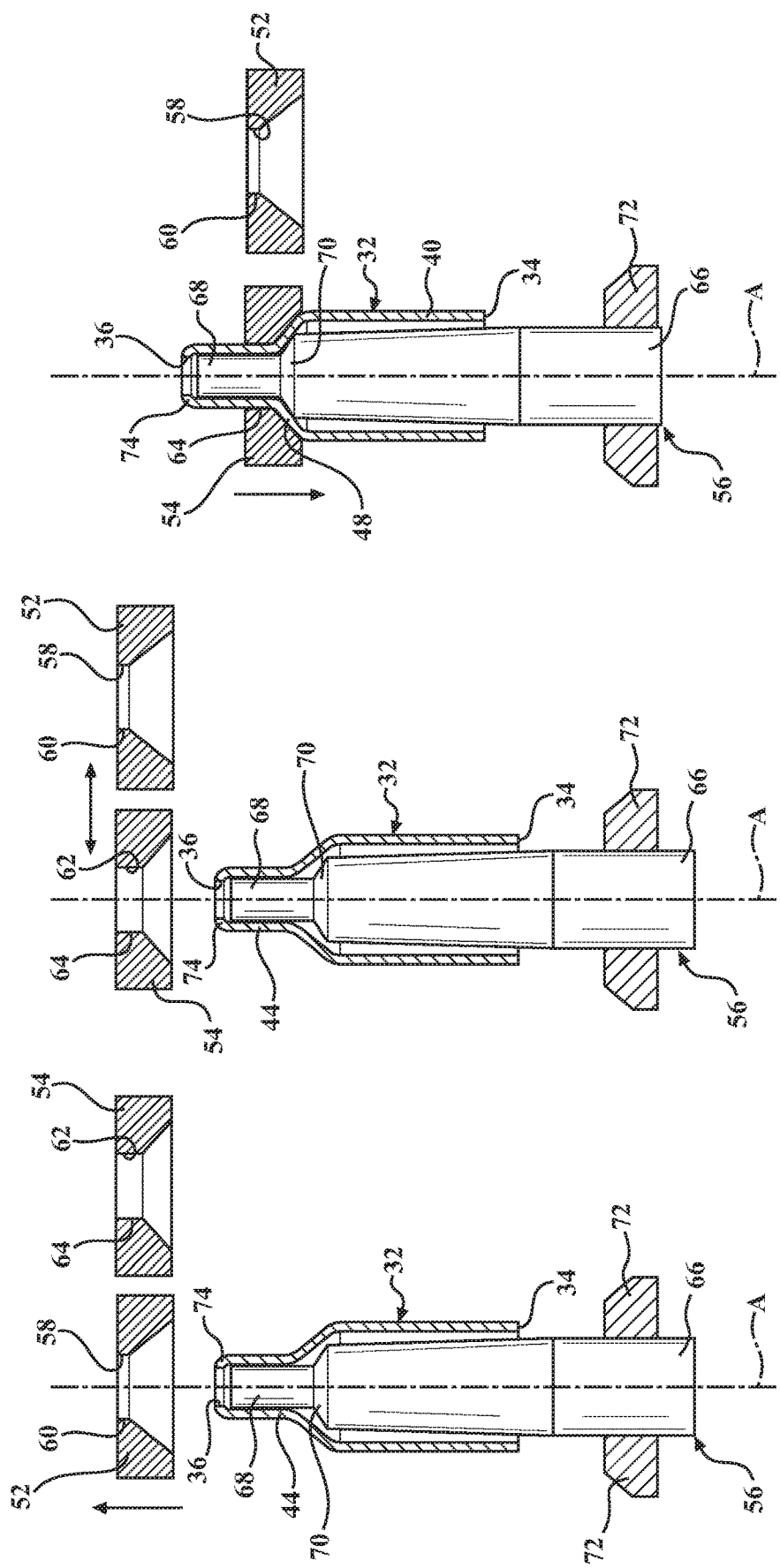
FIG. 8 is an illustrative view of the step of removing the first broaching die of the step of forming the narrowed end section of the method in accordance with the present invention.
FIG. 9 is an illustrative view of the step of aligning the swaging die of the step of forming the intermediate conical section of the method in accordance with the present invention.
FIG. 10 is an illustrative view of the step of compressing the swaging die of the step of forming the intermediate conical section of the method in accordance with the present invention.

As show in FIG. 5, the method includes a first step of disposing the preformed tube 32 about the calibrating mandrel 56 with the first end 34 of the preformed tube 32 resting on the supporting sleeve 72. As shown in FIGS. 6-8, the next step of the method is forming the narrowed end section 44 on the preformed tube 32 adjacent the second end 36 of the preformed tube 32, i.e. a pre-deformation step. The step of forming the narrowed end section 44 includes a step of aligning the calibrating mandrel 56 and the preformed tube 32 coaxially with the opening 58 of the first broaching die 52. After aligning the calibrating mandrel 56 and the preformed tube 32 with the opening 58 of the first broaching die 52, the preformed tube 32 is pressed between the first broaching die 52 and the supporting sleeve 72 using the calibrating mandrel 56 to produce an end crown 74 disposed at the second end 36 of the preformed tube 32 and extending radially inwardly toward the center axis A for engaging the narrowed head section 68 of the calibrating mandrel 56. The end crown 74 is disposed over the narrowed head section 68 of the calibrating mandrel 56 to engage the calibrating mandrel 56. The narrowed head section 68 of the calibrating mandrel 56 may flare outwardly to provide additional resistance to the preformed tube 32 thereby preventing the preformed tube 32 from sliding off the calibrating mandrel 56.

Next, as shown in FIG. 7, the preformed tube 32 is compressed between the first broaching die 52 and the narrowed head of the calibrating mandrel 56 to sandwich the preformed tube 32 between the first broaching die 52 and the narrowed head of the calibrating mandrel 56 in the opening 58, i.e. a pull broaching operation. By compressing the first broaching die 52 against the calibrating mandrel 56, the second end 36 of the preformed tube 32 is forced to abut the narrowed head of the calibrating mandrel 56 allowing the preformed tube 32 and the narrowed head to extend through the bore to produce the narrowed end section 44 having the second predetermined thickness less than the first predetermined thickness and the second predetermined radius $R_2$ between the second end 36 of the preformed tube 32 and an proximate end 46 with the second predetermined radius $R_2$ being less than the first predetermined radius $R_1$ and equal to the opening radius $R_O$. At the same time, the compressing step also forms an extended main section 40 spaced from the narrowed end section 44 extending from the first end 34 of the preformed tube 32 to an intermediate end 42 spaced from the proximate end 46 having the preformed tube radius $R_P$ greater than the second predetermined radius $R_2$ and the preformed tube wall thickness $T_3$ greater than the second predetermined wall thickness $T_2$. The narrowed end section 44 extends from the second end 36 of the preformed tube 32 to the proximate end 46 spaced a predetermined distance D from the second end 36. The predetermined distance D should be equivalent to approximately 60%-80% of the length of the narrowed head section 68. The predetermined distance D may not be greater than the maximum predetermined distance, $D_{max}$. $D_{max}$ can be determined by the following formula:

$$D_{max}=L-[\tan(90-α)-\tan(γ)]*(R_M-R_{HE})-T_3$$

Figure 11:
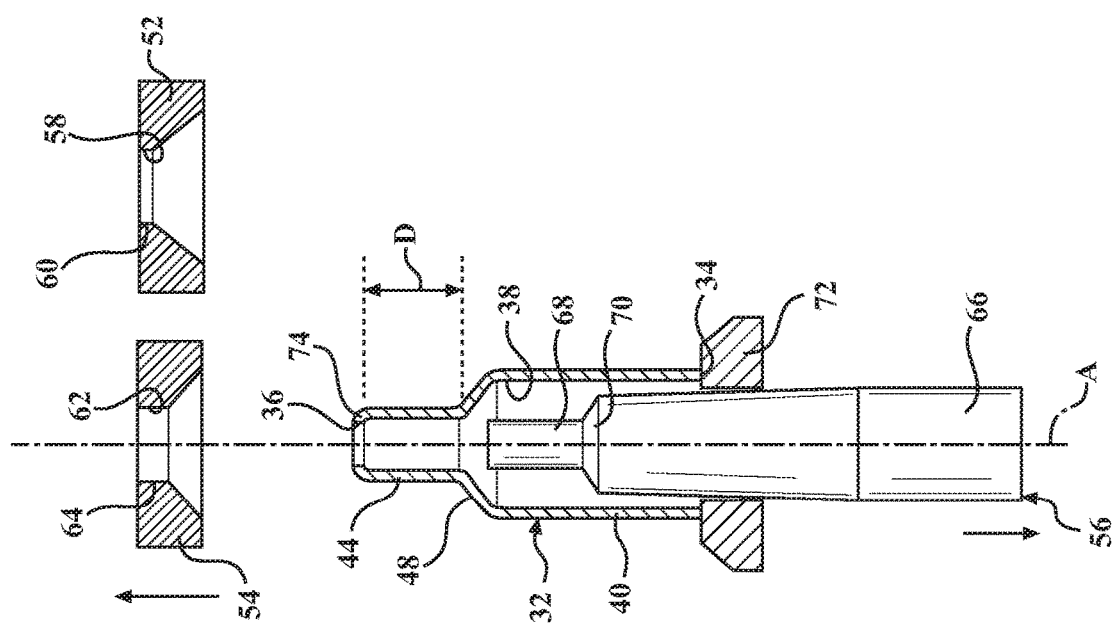
FIG. 11 is an illustrative view of the step of removing the swaging die of the step of the step of forming the intermediate conical section of the method in accordance with the present invention.

After the step of compressing, as shown in FIG. 8, the first broaching die 52 is removed. Then, as shown in FIGS. 9-11, the method includes a step of forming the intermediate conical section 48 on the preformed tube 32 adjacent the narrowed end section 44, i.e. a neck down swaging operation. More specifically, as shown in FIG. 9, the step of forming the intermediate conical section 48 includes a step of aligning the calibrating mandrel 56 and the preformed tube 32 including the narrowed end section 44 coaxially with the hole 62 of the swaging die 54. After aligning the calibrating mandrel 56 and the preformed tube 32 with the hole 62 of the swaging die 54, the narrowed end section 44 of the preformed tube 32 and the narrowed head of the calibrating mandrel 56 are slid through the hole 62 of the swaging die 54. As shown in FIG. 10, the step of forming the intermediate conical section 48 includes a step of compressing the preformed tube 32 between the swaging die 54 and the intermediary section 70 of the calibrating mandrel 56 having the exterior inclination angle γ of being between 45°-65° relative to the reference axis X perpendicular to the center axis A. By compressing, the preformed tube 32 is sandwiched between the swaging die 54 and the narrowed head of the calibrating mandrel 56 in the hole 62 to produce the intermediate conical section 48 having the internal inclination angle θ of between 40°-90° relative to the center axis A and the external tube 32 and an intermediate conical section 48 wall thickness equal to the second predetermined wall thickness $T_2$. After compressing the swaging die 54, the swaging die 54 is removed. After removing the swaging die 54, the preformed tube 32 including the narrowed end section 44 and the extended main section 40 can be used as the damper housing 20. The damper housing 20 may still be clinched to the narrowed head section 68 of the calibrating mandrel 56. Accordingly, the damper housing 20 may be removed by axially retracting the calibrating mandrel 56.

Figure 12:
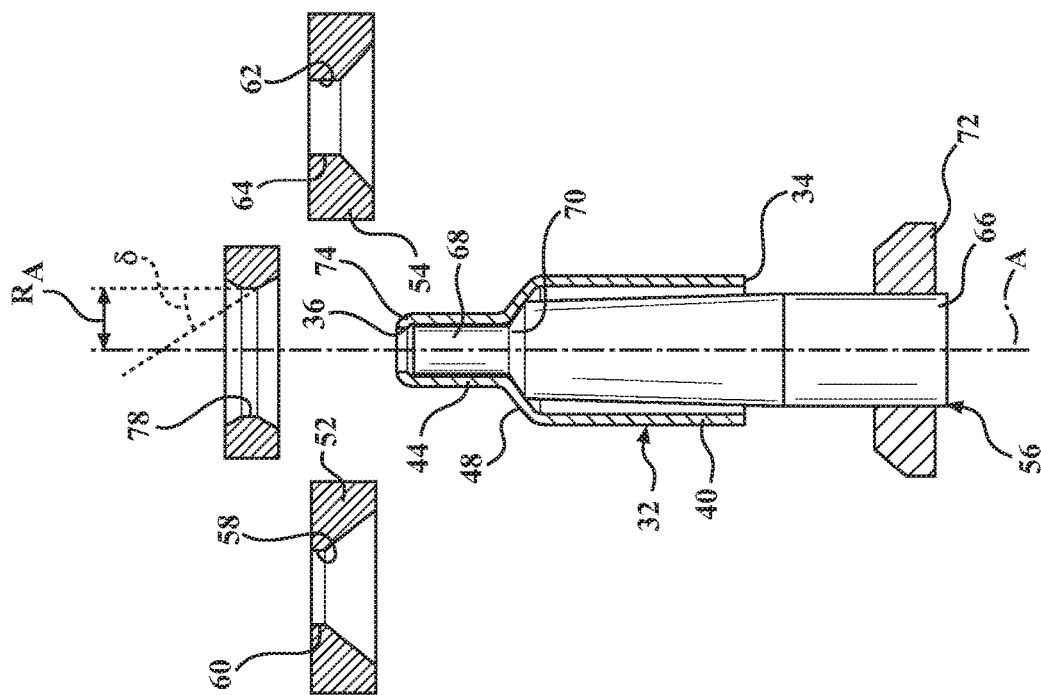
FIG. 12 is an illustrative view of the step of aligning the calibrating mandrel and the preformed tube of the step of shaping the extended main section of the method in accordance with the present invention.
Figure 13:
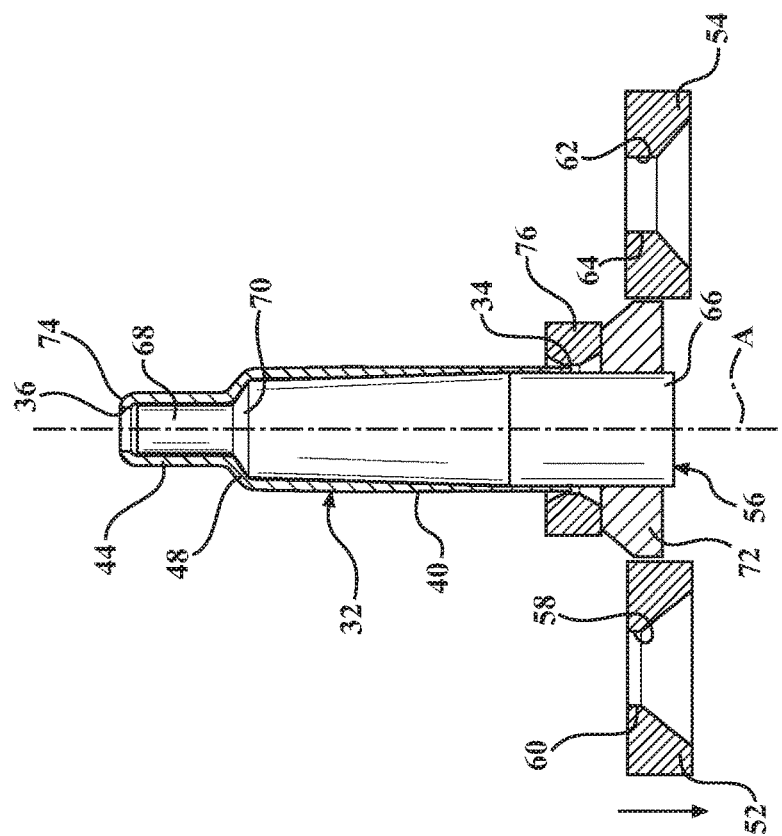
FIG. 13 is an illustrative view of the step of compressing the second broaching die of the step of shaping the extended main section of the method in accordance with the present invention.
Figure 14:
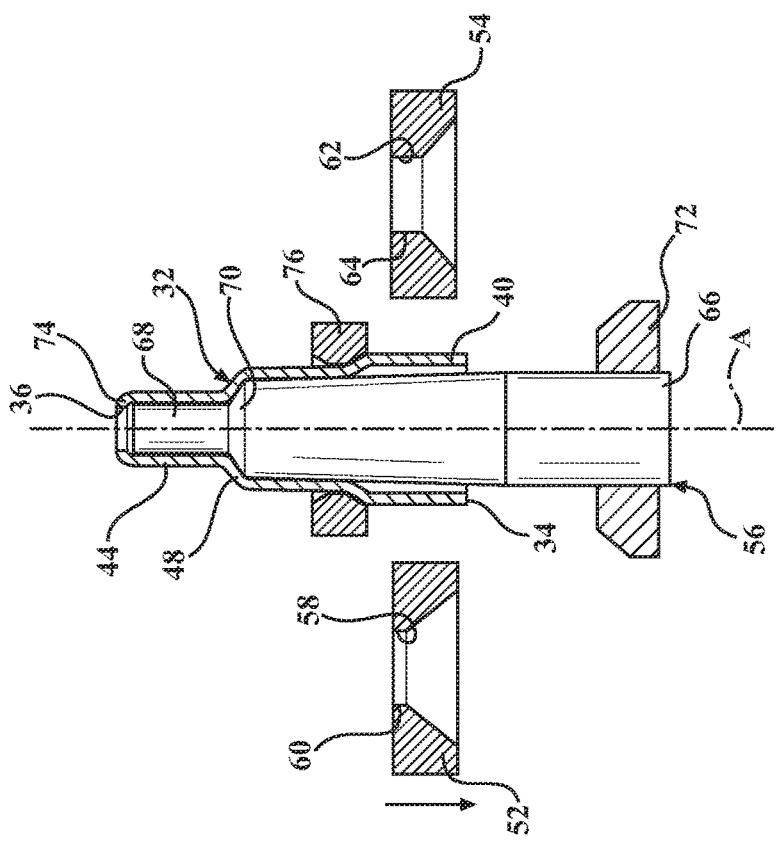
FIG. 14 is an illustrative view of the step of compressing the second broaching die of the step of shaping the extended main section of the method in accordance with the present invention.

After removing the swaging die 54, the method may further include a step of shaping the extended main section 40, i.e. an additional pull broaching operation. As shown in FIGS. 12-14, a second broaching die 76 is used for the step of shaping. The second broaching die 76 defines a shaping aperture 78 having an aperture radius $R_4$ of being equal to the first predetermined radius $R_1$. The shaping aperture 78 flares annularly outwardly at a third angle δ of between 10°-40° relative to a border of the shaping aperture 78. It should be appreciated that the second broaching die 76 may be arranged on the same common head as the first broaching die 52 and the swaging die 54 for coaxially aligning the second broaching die 76 with the calibrating mandrel 56.

The step of shaping further includes a step of aligning the calibrating mandrel 56 and the narrowed end section 44 and the intermediate conical section 48 of the preformed tube 32 with the shaping aperture 78 of the second broaching die 76. After aligning, the calibrating mandrel 56 and the narrowed end section 44 and the intermediate section of the preformed tube 32 on the calibrating mandrel 56 are inserted through the shaping aperture 78 of the second broaching die 76. Then, the step of shaping further includes a step of compressing the extended main section 40 between the second broaching die 76 and body 66 of the calibrating mandrel 56. By compressing, the extended main section 40 of the preformed tube 32 is sandwiched between the second broaching die 76 and the body 66 of the calibrating mandrel 56 in the shaping aperture 78 to force the extended main section 40 of the preformed tube 32 to abut the body 66 of the calibrating mandrel 56 allowing the extended main section 40 of the preformed tube 32 and the body 66 to extend through the shaping aperture 78 to reduce the preformed tube wall thickness $T_3$. In this manner, the extended main section 40 of the preformed tube 32 has a preformed tube wall thickness $T_3$ that gradually increases from the first end 34 toward the narrowed end section 44. Lastly, the step of shaping the extended main section 40 further includes a step of removing the second broaching die 76. It should be appreciated that, when reducing the preformed tube wall thickness $T_3$, a maximal draft constitutes a percentage value of a maximal allowable cross-sectional area reduction. For the present invention, the maximal draft amount is preferably to be approximately 50%.

The above embodiments of the present invention are merely exemplary. The figures are not necessarily to scale, and some features may be exaggerated or minimized. These and other factors should not be considered as limiting to the scope of the invention.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

What is claimed is:

1. A method for manufacturing a damper housing using a preformed tube disposed on a center axis having a first end and a second end, a first broaching die, a swaging die, a second broaching die, a calibrating mandrel, and a supporting sleeve, said method comprising the steps of:

disposing the preformed tube about the calibrating mandrel with the first end of the preformed tube resting on the supporting sleeve, wherein the preformed tube defines a preformed tube wall thickness and a preformed tube radius, the first broach die defines an opening having an opening radius less than the preformed tube radius and flaring annularly outwardly at a first angle of between 10°-40° relative to an edge of the opening, the swaging die defines a hole having a hole radius at least equal to the opening radius and flaring annularly outwardly at a second angle of between 45°-50° relative to an periphery of the hole, the second broaching die defines a shaping aperture having an aperture radius equal to a first predetermined radius, the calibrating mandrel includes a body defining a body radius equal to the first predetermined radius and a narrowed head section spaced from the body defining a head radius less than the opening radius and an intermediary section between the body and the narrowed head at an exterior inclination angle of being between 45°-65° relative to a reference axis perpendicular to the center axis, and the supporting sleeve is disposed about the body of the calibrating mandrel;

forming a narrowed end section on the preformed tube adjacent the second end of the preformed tube;

forming an intermediate conical section on the preformed tube adjacent the narrowed end section; and said step of forming the narrowed end section including a step of compressing the preformed tube between the first broaching die and the narrowed head of the calibrating mandrel to sandwich the preformed tube between the first broaching die and the narrowed head of the calibrating mandrel in the opening forcing the second end of the preformed tube to abut the narrowed head of the calibrating mandrel allowing the preformed tube and the narrowed head to extend through the opening to produce the narrowed end section having a second predetermined wall thickness less than the preformed tube wall thickness and a second predetermined radius equal to the opening radius between the second end of the preformed tube and an proximate end spaced a predetermined length from the second end and defining an extended main section spaced from the narrowed end section extending from the first end of the preformed tube to an intermediate end spaced from the proximate end having the preformed tube radius greater than the second predetermined radius and the preformed tube wall thickness greater than the second predetermined wall thickness; and said step of forming the intermediate conical section includes a step of compressing the preformed tube between the swaging die and the intermediary section of the calibrating mandrel having the exterior inclination angle of between 45°-65° relative to the reference axis to sandwich the preformed tube between the swaging die and the narrowed head of the calibrating mandrel in the hole to produce the intermediate conical section having an internal inclination angle of between 40°-90° relative to the center axis and an intermediate conical section wall thickness equal to the second predetermined wall thickness.

2. The method as set forth in claim 1 wherein said step of forming the narrowed end section further includes a step of aligning the calibrating mandrel and the preformed tube coaxially with the opening of the first broaching die, and pressing the preformed tube between the first broaching die and the supporting sleeve using the calibrating mandrel to produce an end crown disposed at the second end of the preformed tube and extending radially inwardly toward the center axis for engaging the narrowed head section of the calibrating mandrel prior to said step of compressing the first broaching die.

3. The method as set forth in claim 2 further including a step of removing the first broaching die from the preformed tube and the calibrating mandrel after said step of compressing the first broaching die.

4. The method as set forth in claim 1 wherein said step of forming the intermediate conical section further includes a step of aligning the calibrating mandrel and the preformed tube including the narrowed end section coaxially with the hole of the swaging die, and sliding the narrowed end section and the narrowed head of the calibrating mandrel through the hole of the swaging die prior to said step of compressing the swaging die.

5. The method as set forth in claim 4 wherein said step of forming the intermediate conical section further includes a step of removing the swaging die after said step of compressing the swaging die.

6. The method as set forth in claim 1 further including a step of shaping the extended main section of the preformed tube.

7. The method as set forth in claim 6 wherein said step of shaping further includes a step of aligning the calibrating mandrel and the preformed tube including the narrowed end section and the intermediate conical section coaxially with the shaping aperture of the second broaching die.

8. The method as set forth in claim 7 wherein said step of shaping further includes a step of inserting the calibrating mandrel and the preformed tube including the narrowed end section and the intermediate section on the calibrating mandrel through the shaping aperture of the second broaching die.

9. The method as set forth in claim 8 wherein said step of shaping further includes a step of compressing the extended main section between the second broaching die and body of the calibrating mandrel to sandwich the preformed tube between the second broaching die and the body of the calibrating mandrel in the shaping aperture to force the preformed tube between the first end and the intermediate conical section to abut the body of the calibrating mandrel allowing the extended main section of the preformed tube and the body of the calibrating mandrel to extend through the shaping aperture to lower preformed tube cross-section area by a maximal draft of 50% and reduce the preformed tube wall thickness.

10. The method as set forth in claim 9 wherein said step of shaping further including a step of removing the second broaching die.

\* \* \* \* \*